Oct. 18, 1927.

H. NYQUIST 1,645,618

METHOD AND APPARATUS FOR MEASURING TRANSMISSION DELAY

Filed Feb. 25, 1926

2 Sheets-Sheet 1

INVENTOR
H. Nyquist
BY
ATTORNEY

Oct. 18, 1927.   H. NYQUIST   1,645,618

METHOD AND APPARATUS FOR MEASURING TRANSMISSION DELAY

Filed Feb. 25, 1926   2 Sheets-Sheet 2

INVENTOR
H. Nyquist
BY
ATTORNEY

Patented Oct. 18, 1927.

1,645,618

UNITED STATES PATENT OFFICE.

HARRY NYQUIST, OF MILLBURN, NEW JERSEY, ASSIGNOR TO AMERICAN TELEPHONE AND TELEGRAPH COMPANY, A CORPORATION OF NEW YORK.

METHOD AND APPARATUS FOR MEASURING TRANSMISSION DELAY.

Application filed February 25, 1926. Serial No. 90,653.

It is an object of my invention to provide a method and suitable apparatus for measuring the delay in signal transmission by an alternating current through a given line or through any transducer. Another object of my invention is to provide for measuring signal transmission delay at various carrier-current frequencies so that a delay-frequency characteristic can be plotted from the data obtained. Another object of my invention is to provide for measuring signal transmission delay at any desired carrier-current frequency by modulating the corresponding current with a comparatively low frequency deformation. Another object of my invention relates to providing for rapid and convenient measurement of signal transmission delay. All these objects and various other objects of my invention will become apparent on consideration of a limited number of examples of practice according to the invention which I have chosen for disclosure in the following specification taken with the accompanying drawings. It will be understood that the following description relates to these particular examples of the invention, and that the invention will be defined in the appended claims.

Figure 1:
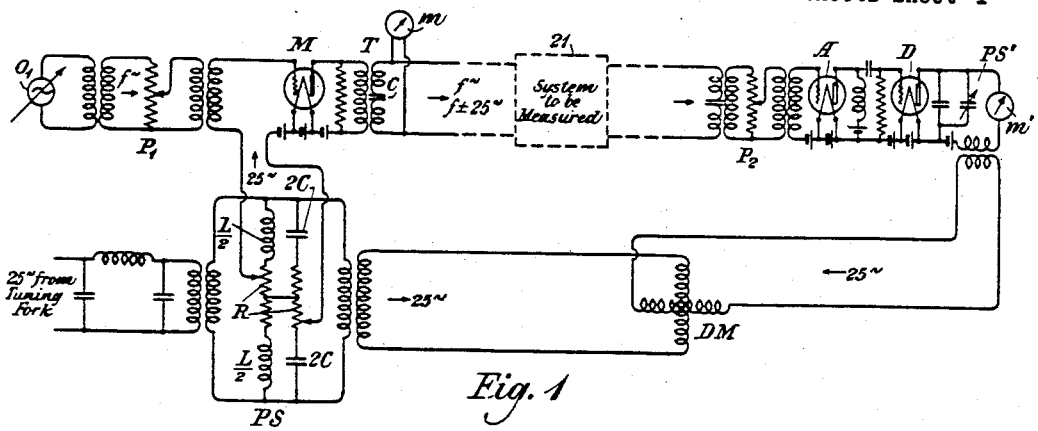
Figure 2:
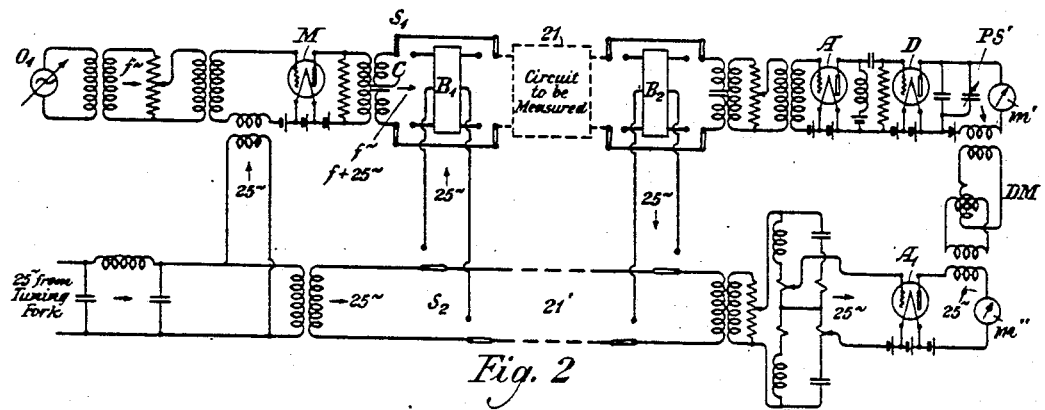
Figure 3:
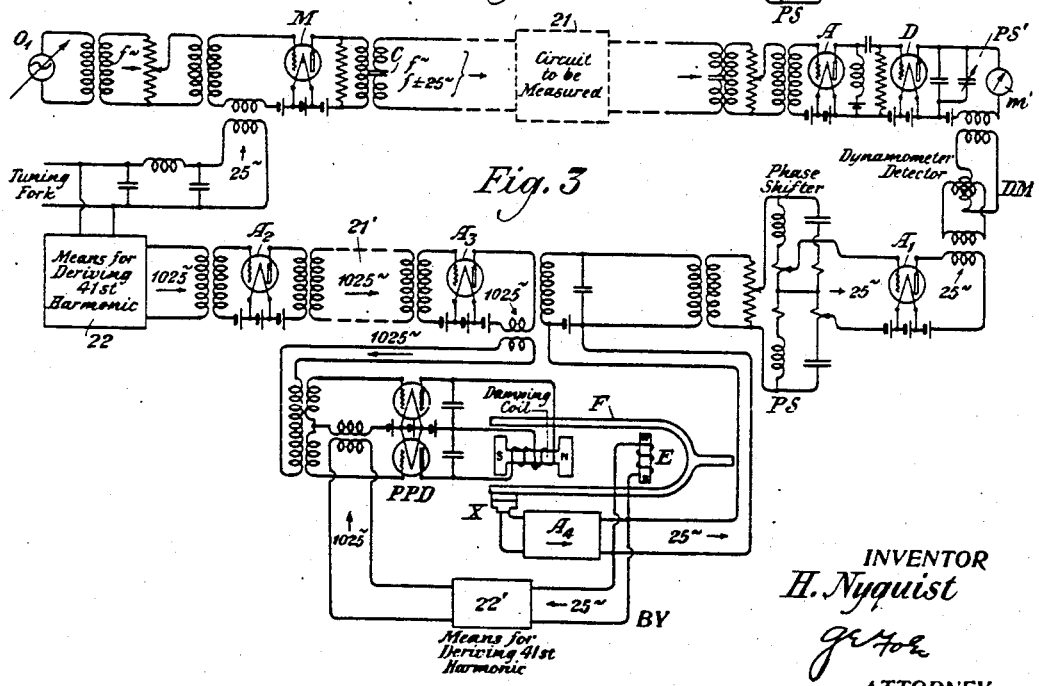
Figure 4:
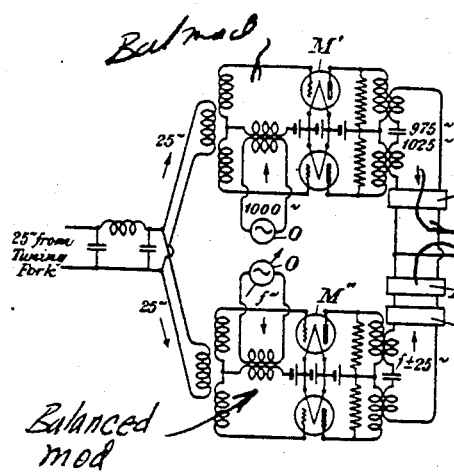
Figure 4:
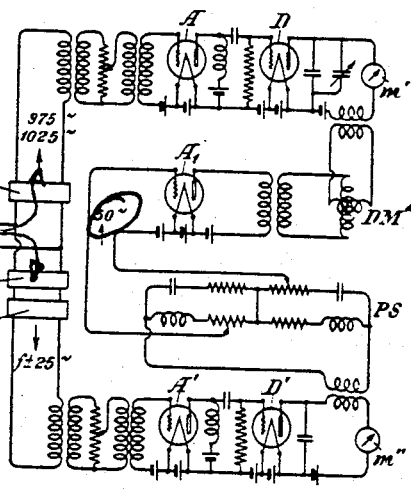
Figure 5:
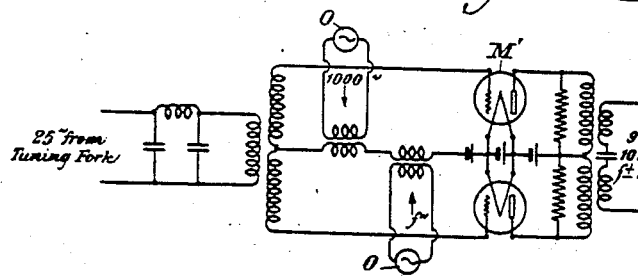
Figure 6:
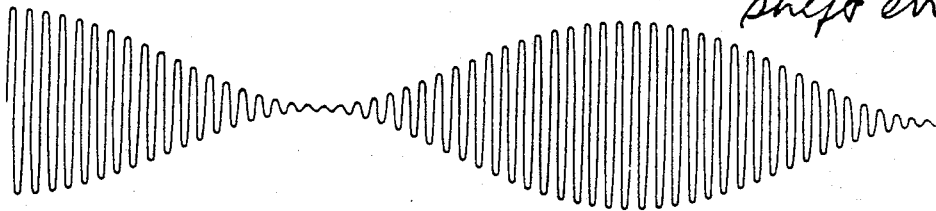
Figure 7:
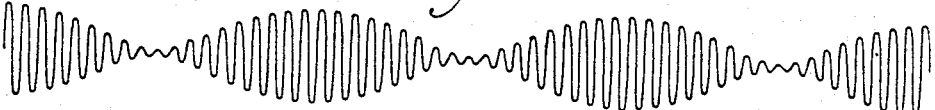
Figure 8:
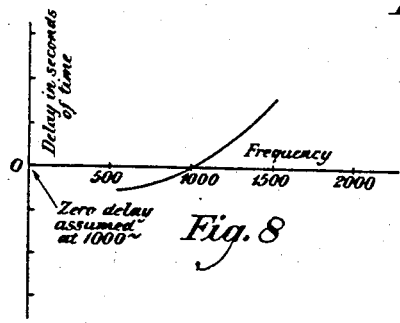

Referring to the drawings, Figure 1 is a diagram of apparatus that may be employed for measuring signal delay through a transducer whose input and output terminals are near together. Fig. 2 is a diagram for cases when the input and output are far apart, as when the transducer is an extended transmission line. Fig. 3 is a diagram corresponding in many respects to Fig. 2, but without direct transmission of low frequency modulating current as in Fig. 2. Fig. 4 is a diagram of a system somewhat like Fig. 3, but with suppression of current of carrier frequency. Fig. 5 is a diagram of a modified sending end for Fig. 4. Figs. 6 and 7 are diagrams illustrating carrier current modulated at relatively low frequencies, and Fig. 8 is a delay-frequency characteristic.

Referring to Fig. 1, it is desired to measure the delay through the transducer 21 with its input on the left and its output on the right. An oscillator $O_1$, adjustable as to frequency, is provided, and its current output goes as the carrier current through the potentiometer $P_1$ to the modulator M. This carrier current, of frequency $f$, is modulated by current of frequency 25 cycles per second from a tuning fork transmitted through the adjustable phase shifter network PS. The modulated current output from M may be of the character shown in Fig. 6 which represents 1000 cycle current modulated by 25 cycle current. In the output, the low frequency component, 25 cycles, is practically suppressed by the interposition of the condenser C in the secondary of the transformer T. The output current can be adjusted for volume at potentiometer $P_1$ according to the indication of the meter $m$.

The output current from the transducer 21 goes through the potentiometer $P_2$ and amplifier A to the detector D whose output circuit is bridged by two condensers in parallel, one of them, PS', being adjustable. This output circuit also comprises a meter $m'$. According to the normal operation of detector D, the current in the output circuit is of 25 cycle frequency.

A dynamometer detector DM is provided with two windings, one receiving 25 cycle current directly from the tuning fork, and the other receiving 25 cycle current from the detector D. One of the coils is movable, and the other one is fixed, and, as is well known, the torque on the moving coil for small deflections will be approximately $$T = K\ A_1\ A_2\ \cos B$$

where $A_1$ and $A_2$ are the current strengths in the two coils, B is the difference in phase of the two currents, and K is a constant. Obviously, the torque is zero when $B = 90°$, and it is evident that this zero reading is not affected by the magnitudes of $A_1$ and $A_2$.

The construction of the phase shifter PS will be apparent from Fig. 1. The impedance elements shown in the drawing are subject to the relation that $$2\pi f\ L = R = 1/2\pi f C.$$

It will be seen in Fig. 1 that the connected midpoints of the two resistances R are at the same potential. By moving the taps shown away from these resistances in suitably related steps, the output of the phase shifter can be made to vary in phase, and the magnitude can be kept constant while the phase is shifted through 360°. The intercepted resistances from the midpoints to the two taps must be related as the sine and cosine of the angle of phase shift. Values one way from each midpoint will be positive and the other way will be negative.

It is to be understood that in this case we are not concerned with the mere delay in transmission of wave crests of a given frequency, but our concern is with the delay in the transmission of signals on that frequency. It is only by some deformation of a current of a given frequency that signal information can be conveyed on it. According to the present disclosure, I deform a carrier current of frequency $f$ by modulating it with a standard frequency of 25 cycles per second, and I get the delay or phase shift in the transmission of the modulating frequency. In general, with a carrier frequency $f$ and a modulating frequency $p$, $$D = (1/360)(m/p),$$

where D is the delay in seconds of time and $m$ is the phase shift of the envelope of the modulated wave in degrees, the envelope referred to being apparent in Fig. 6.

The phase shifter PS is calibrated. A phase shift of 360° will correspond to the time of one cycle of the 25 cycle current, that is, it will correspond to 1/25 second of time. If there are 40 steps in the phase shifter, each step will correspond to 0.001 second of time and 9° of angular phase shift. The time step referred to, namely 0.001 second of time, is convenient. Inasmuch as phase shifts and delays are here measured by using zero readings on the dynamometer, it is possible to arrange the apparatus so that the accuracy of these measurements is not substantially affected by variations in transmission equivalent of the system being measured.

Let the reading of the phase shifter PS in seconds of time be $M_o$ for a measurement over a zero delay transducer as, for example, an artificial resistance line. It is assumed that $M_o$ is constant for all values of the carrier frequency. A phase correcting network may be added to the measuring apparatus if necessary to make this condition hold. Let the reading of the phase shifter be $M_t$ over the transducer to be measured using a carrier frequency $f$. Then the delay of the system at frequency $f$ is $$D_t = \frac{1}{360} \frac{M_t - M_o}{p}$$

An integral multiple of $\pi$ may not be taken care of in this measurement, but this is of little consequence inasmuch as we are chiefly concerned with relative delay and not absolute delay.

Accordingly in Fig. 8, we propose to plot delay against frequency, assuming zero delay at 1000 cycles as a convenient point of reference. The delay at any other frequency $f$, relative to the standard, is given by the equation $$D_t - D_{1000} = \frac{1}{360}\left[\frac{M_t - M_o}{p} - \frac{M_{1000} - M_o}{p}\right] = \frac{1}{360} \frac{M_t - M_{1000}}{p}$$

The procedure to measure the relative delay at any particular frequency $f$ is simply first to adjust the oscillator $O_1$ to 1000 cycles and then adjust the phase shifter PS to get a null effect in the dynamometer DM, noting the reading on PS as $M_{1000}$; then to adjust $O_1$ to the frequency $f$ and to repeat the measurement, noting $M_t$. The relative delay is then $$D_t = \frac{1}{360} \frac{M_t - M_{1000}}{25},$$

assuming 25 cycles as the modulating frequency, and this value of $D_t$ can be entered on a diagram such as Fig. 8. $M_{1000}$ is now determined once for all, and by simply repeating the above measurement for $M_t$ at some other frequencies, the entire diagram of Fig. 8 can be constructed.

If it is necessary to measure the delay in smaller steps than 0.001 second of time, the variable condenser PS' may be used. By adjustment, this will vary the phase of the 25 cycle detected current, and it can be arranged so that the full range of this condenser will be equivalent to a 0.001 second delay. By calibrating the condenser PS' for the intermediate range, intermediate measurements of delay can be made over intervals of less than 0.001 second of time.

In Fig. 2, a system is shown similar to that of Fig. 1, but modified for the case when the input and output terminals of the system to be measured are widely separated. The matter of transmission delay may be of much importance in connection with extended transmission lines, and in such cases the input and output terminals may be hundreds of miles apart. In Fig. 2, such an extended transmission line is represented at 21, and another line is represented at 21'. It will be seen that this other line 21' transmits 25 cycle frequency all the time, and the variable adjustment of frequency at the oscillator $O_1$ has no effect on the 25 cycle current going over the circuit 21' and through the phase shifter PS and amplifier $A_1$ to one of the two coils of the dynamometer detector DM. But the delay is different for different frequencies as transmitted through the circuit 21 which is to be measured, as will readily be understood from the explanation that has been given for Fig. 1.

In Fig. 2, the operator at the sending end merely adjusts the frequency of the oscillator $O_1$ from one to another of a set of agreed values in succession. The operator at the receiving end adjusts the phase shifter PS for each new incoming frequency so as to get a null effect at the dynamometer detector DM, and makes a table of readings $M_t$, from which he can at once compute the values of $D_t$ by means of the foregoing formula, and from them get a plot like Fig. 8.

If it is desirable not to require the use of an auxiliary circuit such as 21' in Fig. 2, the switches $S_1$ and $S_2$ may all be thrown so as to connect the 25 cycle current through the composite sets $B_1$ and $B_2$. In this case, the 25 cycle current will be superposed and transmitted on the line 21, but will be separated out at the receiving end by the composite set $B_2$.

Fig. 3 illustrates a modification also intended for "straightaway" operation like Fig. 2, that is, for measurement of delay in extended transmission systems instead of in loop circuits or transducers as shown in Fig. 1. In Fig. 3, the 25 cycle current is not transmitted either over the circuit 21 to be measured nor over the auxiliary circuit 21'. This might be a desirable procedure, for example, in case the lines are in use for telegraph channels while measurement is being made for delay at telephonic frequencies. Upon comparing Fig. 3 with Fig. 2, it will be seen that in Fig. 3 the 25 cycle current is not applied to the auxiliary circuit 21', but goes to the input of apparatus 22 which is well known apparatus for deriving a suitable harmonic. In this case, the harmonic that is derived and transmitted is the 41st; that is, a current of 1025 cycles per second.

At the receiving end, this 1025 cycle current goes to one of the two inputs of a push-pull detector PPD whose output goes to the damping coil associated with the tuning fork F. This tuning fork is tuned naturally as nearly as practicable to 25 cycles of vibration per second. The core of the damping coil is a permanent magnet and a total current in the windings one way increases the rate of the fork but the other way decreases it. The tuning fork operates a variable carbon resistance X which governs the input current to the amplifier $A_4$, and accordingly the amplifier output will be a current of the tuning fork frequency. This current of tuning fork frequency goes from the amplifier $A_4$ over three multiple branch circuits. One of these branch circuits goes to the coil E which operates to apply power magnetically to sustain the vibration of the tuning fork F. Another branch circuit goes to the phase shifter PS where its application is just the same as in Fig. 2. The third branch circuit goes to the apparatus 22' which is like 22 and derives the 41st harmonic from the current of tuning fork frequency. Since the tuning fork is of about 25 cycles frequency, this 41st harmonic will be of about 1025 cycles frequency; it goes to the second pair of input terminals of the push-pull detector PPD.

If the two electromotive forces on the grids of the push-pull detector PPD, due to the two inputs, were in quadrature, the outputs would be equal and opposite and, therefore, of null effect in the damping coil. Any departure from this quadrature relation, as if the tuning fork F tended to go a little faster than 25 cycles of vibration per second, would cause more current to flow in one detector output circuit than in the other. This excess current one way in the damping coil would tend to reduce the frequency of the tuning fork slightly. On the other hand, if the tuning fork tended to go a little slower than 25 cycles per second, the excess current in the damping coil would be the other way and would tend to increase the frequency of the fork. In this way, the frequency of the tuning fork is forced to correspond to the frequency of the incoming current, and therefore the current from the tuning fork to the phase shifter PS corresponds in frequency and stands in definite phase relation with the 25 cycle current generated and applied at the sending end.

Fig. 4 shows still another method for "straightaway" measurement of delay. In this disclosure, the carrier frequency is suppressed and the standardizing current is superposed and transmitted over the circuit under measurement. At the sending end, modulators M' and M'' are employed, and to one input of each the standard 25 cycle current from a tuning fork is applied. For the remaining inputs of these modulators, one of them M' receives 1000 cycle current all the time from the oscillator $O_{1000}$, and the other modulator M'' receives current of desired frequency $f$ from the oscillator $O_f$. As shown in Fig. 4, the modulators M' and M'' are balanced modulators, and therefore the input frequencies are not present in their outputs, but only the sum and difference frequencies, as indicated by the legends in the diagram. The output currents of 975 cycles and 1025 cycles per second from the modulator M' go through a band pass filter to the circuit 21 under measurement. The output current from the modulator M'' goes through a band suppression filter which suppresses 975 cycle current and 1025 cycle current, but passes the current of frequency $f \pm 25$ cycles. In series with the last mentioned band suppression filter is a delay compensating network, so that the combined delay through the said filter and network is the same for all frequencies.

At the receiving end, branch circuits are provided with corresponding band pass filter in one and band suppression filter and delay compensating network in the other. One of these circuits passes the 975 cycle current and the 1025 cycle current to the amplifier A and thence to the detector D whose output will be 50 cycle current. This will be readily seen from Fig. 7 which represents superposed 975 cycle current and 1025 cycle current, and it will be seen that the envelope frequency is 50 cycles per second. This 50 cycle current from the detector D goes to on of the two coils of the dynamometer detector DM.

In the same way, the two currents of frequency $f+25$ cycles and $f-25$ cycles in the other branch circuit go through the amplifier A′ to the detector D′ whose output will accordingly be 50 cycle current. This 50 cycle current from detector D′ goes through the adjustable phase shifter PS and amplifier $A_1$ to the other coil of the dynamometer detector DM.

The operation of the system shown in Fig. 4 will be understood from the description of the earlier figures. By adjusting the phase shifter PS and reading its calibrated values, the delay may be computed by means of the simple formula given heretofore.

Since 50 cycle current is now used for comparison instead of 25 cycle current, as for the earlier figures, it is here convenient to have the phase shifter designed so each step corresponds to a phase shift of 18° which is equivalent to a delay of 0.001 second of time. In this case, the difference in phase between the two detector output currents of 50 cycle frequency is due to the difference in phase shift through the transducer of the frequency $f$ cycles and of the frequency 1000 cycles. Because the delay introduced by the filters will vary with frequency, the compensating networks are introduced. Otherwise, it would be necessary to calibrate the apparatus by measuring the delay at various frequencies over a zero delay transducer, and then the corrections would need to be applied to all delays at corresponding frequencies as measured thereafter.

Fig. 5 shows a modification for the sending end of Fig. 4. The part of Fig. 4 to the left of the letter G may be replaced by what is shown in Fig. 5. In Fig. 5, a single balanced modulator M′ is employed with three input circuits so that both frequencies, 1000 cycles and $f$ cycles, are modulated by 25 cycles. Since the modulator is balanced, all the input frequencies are absent in the output, and the sum and difference frequencies appear, namely, 975 cycles, 1025 cycles and $f \pm 25$ cycles. It will be seen that this gives the same input to the transducer as in Fig. 4.

The delay of transmission that is measured by my method is a delay in deformation of a current of desired frequency. A standard low frequency is employed all the time to produce the deformation so that the only input adjustment necessary is of the frequency of the carrier current as described.

A change of adjustment of the carrier current frequency on the input side merely requires a change of adjustment of the phase shifter to get a null effect in the dynamometer detector on the output side. This change of adjustment of the calibrated phase shifter from its reading for 1000 cycle current gives a numerical value proportional to the change of delay from that for 1000 cycles. It will be seen that my method and apparatus serve effectively for the rapid measurement of delays at various frequencies which it may be desired to investigate.

I claim:

1. The method of measuring signal transmission delay through a transducer at a desired frequency of carrier current, which consists in modulating that current by a standard low frequency and applying the modulator output to the transducer input, transmitting the modulated current through the transducer, detecting the current to obtain the modulating frequency on the output side, and measuring its phase shift at the frequency of the carrier current to get the relative delay at that frequency.

2. The method of ascertaining the delay in a transducer, which consists in modulating the current of desired frequency by a standard low frequency current at the sending end, and determining the phase shift of the modulations at the receiving end.

3. The method of measuring relative transmission delay through a transducer at two desired frequencies of current, which consists in deforming that current at each frequency on the input side, and noting the relative delay in reception of a corresponding deformation on the output side.

4. The method of measuring transmission delay through a transducer at a desired frequency of current, which consists in producing a low frequency deformation of the current on the input side, and noting the delay in reception of the corresponding deformation on the output side.

5. The method of measuring transmission delay through a transducer relatively to the delay on a certain standard frequency, which consists in deforming the currents through the transducer, and noting the phase shift of the deformation in passing from the said standard frequency to the frequency for which a relative measurement is desired.

6. The method of measuring signal delay on a carrier current through a transducer, which consists in modulating the input current with a standard low frequency current, transmitting the modulated current through the transducer, and also transmitting through another channel a current simply related to the modulating current and thereby producing a current of said standard low frequency adjacent to the output side of said transducer, detecting the modulating component in the modulated current on the output side of said transducer, making comparison for phase relation between said modulating component and said current of standard low frequency produced adjacent to the output side of the transducer, and noting the shift of phase necessary to establish a certain standard phase relation for each frequency of carrier current transmitted.

7. Means for measuring signal delay through a transducer comprising a modulator with output connected to the transducer input, an oscillator of adjustable frequency connected to the modulator input, a source of standard frequency electromotive force to modulate the current from said oscillator, means for comparing two currents of the same frequency for their phase relation, a detector having its input connected with the transducer output and its output connected to said means, means to derive current from said source of standard frequency over a channel unaffected by frequency changes of said oscillator and apply said current to said comparing means, and a phase shifter in one of said connections to said comparing means.

8. In the measurement of signal transmission delay on a carrier current through a transducer, means to send carrier current modulated by low frequency current through the transducer, means to detect the low frequency component in the transducer output, and means to make phase comparison between the detector output and said low frequency current.

In testimony whereof, I have signed my name to this specification this 23rd day of February, 1926.

HARRY NYQUIST.